Jan. 5, 1932.  E. D. FAGEROS  1,839,539
BREAD TOASTER
Filed Dec. 12, 1928   3 Sheets-Sheet 3

INVENTOR.
EDGAR D. FAGEROS.
BY HIS ATTORNEYS.

Patented Jan. 5, 1932

1,839,539

UNITED STATES PATENT OFFICE

EDGAR D. FAGEROS, OF MINNEAPOLIS, MINNESOTA

BREAD TOASTER

Application filed December 12, 1928. Serial No. 325,435.

This invention relates to a toasting device and particularly to such a device of the electrical type. Toast is now made in large quantities, not only in domestic establishments, but in restaurants and in many sandwich shops where toasted sandwiches are served. It is desirable to have a toasting device which will efficiently toast the bread without burning or overheating the same. It is also desirable to have a device which is easily and quickly operated and which does not require the constant attention of the operator after the bread has been placed therein. It is furthermore desirable to have a toaster which will properly toast the bread, indicate when the toasting operation is finished and keep the toast warm until the same is taken from the device.

It is an object of this invention, therefore, to provide a simple and efficient toasting device which can be easily and quickly operated and which will not overheat or burn the toast.

It is a further object of the invention to provide a simple and efficient toasting device which will indicate when the toasting operation is completed and will keep the toast warm until the same is taken from the device.

It is still another object of the invention to provide an electrical toasting device having heating means together with means for supplying current to said heating means to toast the bread and having means to later reduce the current supply, as well as means for subsequently cutting off the supply of current and heat.

It is more specifically an object of the invention to provide an electrical toasting device having movable means for supporting slices of bread, heating means for toasting said slices, a manually operated switch for closing an electric circuit to supply current to said heating means, a time controlled means for reducing said current and preferably operating a signal, and manually operated means for cutting off said current.

These and other objects and advantages of the invention will be fully set forth in the following description made in connection with the accompanying drawings, in which like reference characters refer to similar parts throughout the several views, and in which:—

Figure 1:
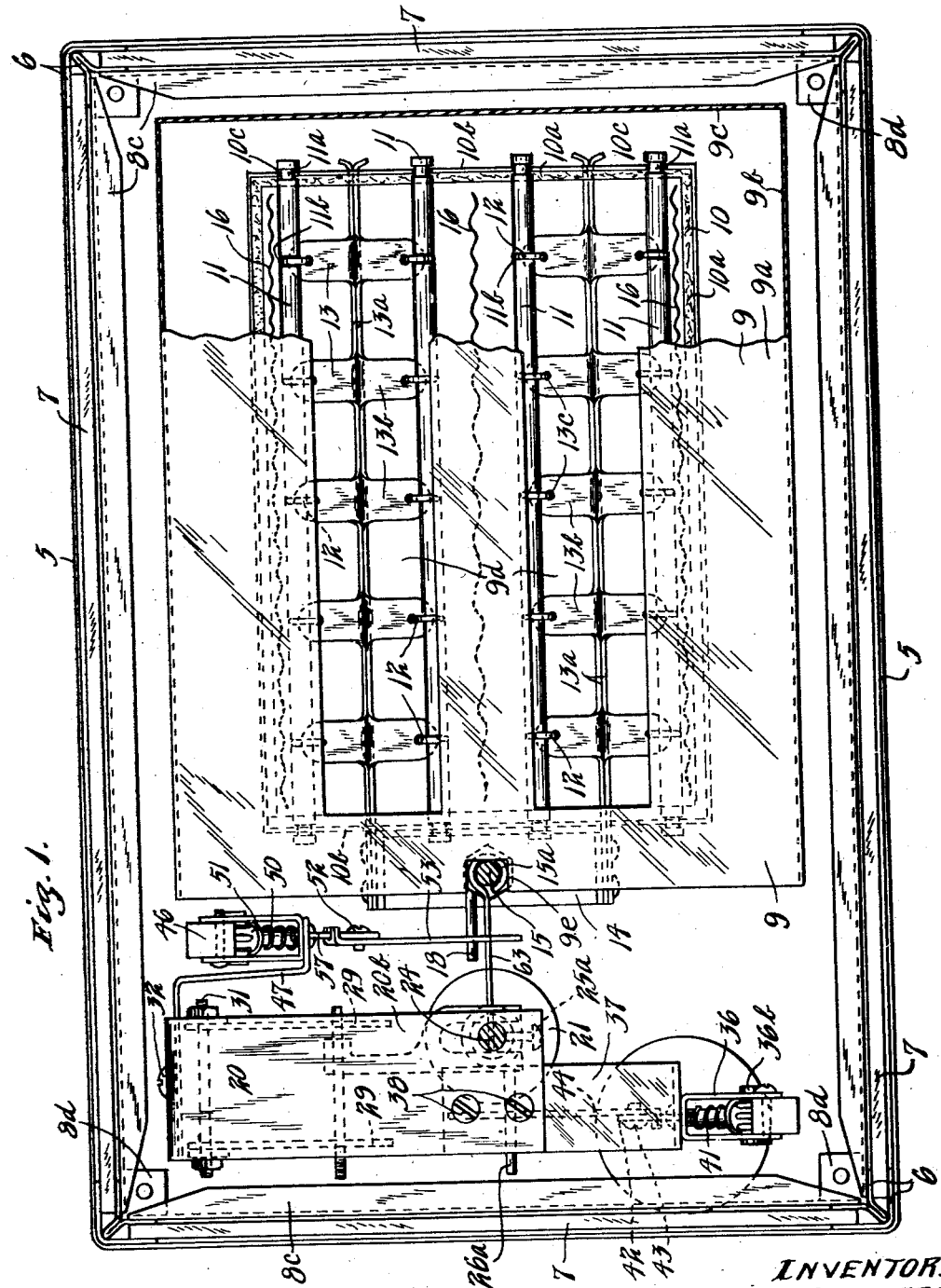
Fig. 1 is a plan view of the device, with certain portions broken away and other portions shown in horizontal section.

Referring to the drawings, a casing is shown comprising a lower frame portion 5 of rectangular form having vertically extending narrow flanges and bottom portions 5a. The bottom portion 5a is secured to and carried on four legs 5b. Angular posts 6 rise from the corners of member 5 comprising spaced portions secured to member 5 and between which portions are disposed plate members 7. The plate members 7 form the sides of the casing and are preferably of translucent vitreous material. Plates 7 extend substantially to the top of the posts 6 and are overlapped by a downwardly extending flange 8a of a top plate 8 secured to the posts 7 by screws or bolts 8e. The top plate 8 has a plurality of slots 8b extending longitudinally thereof which are substantially co-extensive with slots in the casing below the plate to be later described. Angle members 8c are also secured to the posts 6 and extend therebetween at the ends and sides of the frame and at the inner sides of members 7. Nuts 8d are soldered or welded to members 8c at adjacent ends thereof adapted to receive screws 8e for holding top plate 8 in place. A rectangular casing 9 is disposed within the casing formed by members 6, 7 and 8, which casing has a top 9a, side walls 9b and one end wall 9c, being open at its other end. The top 9a has a plurality of longitudinally extending slots 9d therethrough substantially aligned and co-extensive with the slots 8b already described. Within the casing 9 is another rectangular casing 10, the walls of which comprise a layer of insulating material 10a. Said casing 10 has end plates 10b having slots 10c therein in which are received rods 11 extending between said end walls. Said rods 11 have circumferential grooves 11a fitting in the slots 10c whereby any appreciable endwise movement of said rods is prevented. The rods 11 also have a plurality of intermediate circumferential grooves 11b formed therein and small rods or wires 12 are bent around the rods 11 in grooves 11b and extend downwardly vertically from the inner sides of said rods.

Toast carriers or supporting means 13 are provided, each comprising a pair of plate-like strips 13a having their flat sides in contact and each having a plurality of lugs 13b formed thereon and bent at right angles thereto. The lugs on said plates 13a extend respectively in opposite directions. The lugs 13b have apertures 13c therethrough through which pass the wires or rods 12. The plates 13 extend through slots 10d extending vertically through the end walls 10b, said members 13 are secured to a channel shaped member ends bent outwardly in opposite directions as shown in Fig. 1. At their other ends the members 13 are secured to a channel shaped member 14 by suitable screws or rivets. Vertically disposed heating elements 16 are suitably mounted in any convenient manner between the wires or rods 12 carried by the inner pair of rods 11 and at the outer sides of the wires 12 carried by the outer rods 11, the latter heating elements being adjacent the walls of casing 10. Any suitable form of electric heating element can be used and these usually comprise a sheet of insulating material on which is mounted a plurality of strands or convolutions of small wire having considerable resistance. The member 14 has secured thereto the lower end of a rod 15, said rod being threaded and having nuts 15a thereon at either side of member 14 and extending vertically through top plate 9 which has a slot 9e therethrough through which rod 15 passes. Rod 15 also extends through an opening in top plate 8 and has secured to its upper end a knob-like handle 17. A rod or wire 18 extends around plunger 15 under the top nut 15a being held thereby and has a projecting end for a purpose to be later described.

A base plate 19 is disposed over the bottom 5a and has secured thereto a frame member 20 in the form of a narrow plate having a horizontal bottom portion, a vertically extending side portion 20a and a horizontally extending top portion 20b. A cylindrical block 21 is secured to member 20 and has secured thereto and rising therefrom a tubular member 22. A coiled compression spring 23 surrounds tube 22, being secured at its bottom to block 21. A plunger 24 is slidable in tube 22 and has a collar 25 secured thereto by the set screw 25a engaging the upper end of spring 23. Plunger 24 has a slot 24a therethrough through which extends an arm 26 to be later described and said plunger 24 extends through top plate 8 and has a screw 27 on the side thereof adjacent its upper end. A knob-like handle 28 has a hub or sleeve 28a fitting over plunger 24 and provided with a helical groove 28b into which screw 27 projects, sleeve 28a fitting plunger 24 rather tightly. A small rod 63 is secured in plunger 24 and has a loop 63a surrounding rod 15, the latter having a pin 64 projecting therefrom below loop 63a.

A clock work mechanism is provided carried in a pair of parallel plates 29 secured to lugs 30 by the threaded and nutted screws 31, said lugs 30 being formed on the ends of a strip secured to the vertical portion 20a of member 20 by the screws 32. Said clock work mechanism comprises a driving gear 33 to which arm 26 is secured and the usual reducing gears including an escapement wheel 34 engaged by a pawl carried by a pendulum 35.

A switch member 36 is provided carried on a plate-like bracket 37 secured to top portion 20b of member 20 by screws 38, said switch being secured to member 37 by screws 39. Said switch comprises a fixed contact member 36a having a binding post 40 thereon and a movable contact member 36b. Member 36b is movable in an opening 36c in the switch plate and has a plunger portion surrounded by a coiled compression spring 41. Said plunger portion has a slot 36d at its end in which the transverse pin-like portion 42a of a member 42 is adapted to enter, said member having lateral projections 42b at each side of member 42a. Member 42a is secured by a screw 43 which may serve as a binding post to a bar or lever 44 having an elongated slot 44a therein into which projects a pin 26a extending laterally from arm 26. A coiled tensile spring 45 is secured to bar 44 intermediate the ends thereof and to the member 37 adjacent the upper corner of the latter.

Another switch 46 is provided carried by a plate 47 secured to the vertical portion 20a of member 20 by the headed and nutted bolt 48. The switch 46 comprises a fixed contact member 46a having a binding post 49 thereon and a movable contact member 46b. Member 46b is similar to member 36b already described and swings in an opening 46c in the switch plate 46, the same having a projecting plunger-like portion surrounded by a coiled spring 50 having a slot 50a in its end adapted to receive a central pin-like projection 51a of a member 51, which like the member 42, also has projecting prongs at either side of member 51a. The member 51 is secured by screw 52 which may serve as a binding post, to bar or lever 53 having an elongated slot 53a therein open at its end into which projects member 18 already described. A lamp socket 54 is mounted on the base member 19 in which is disposed a lamp bulb 55, and while any kind of lamp bulb may be used, in practice one colored red has been found very suitable.

Figure 3:
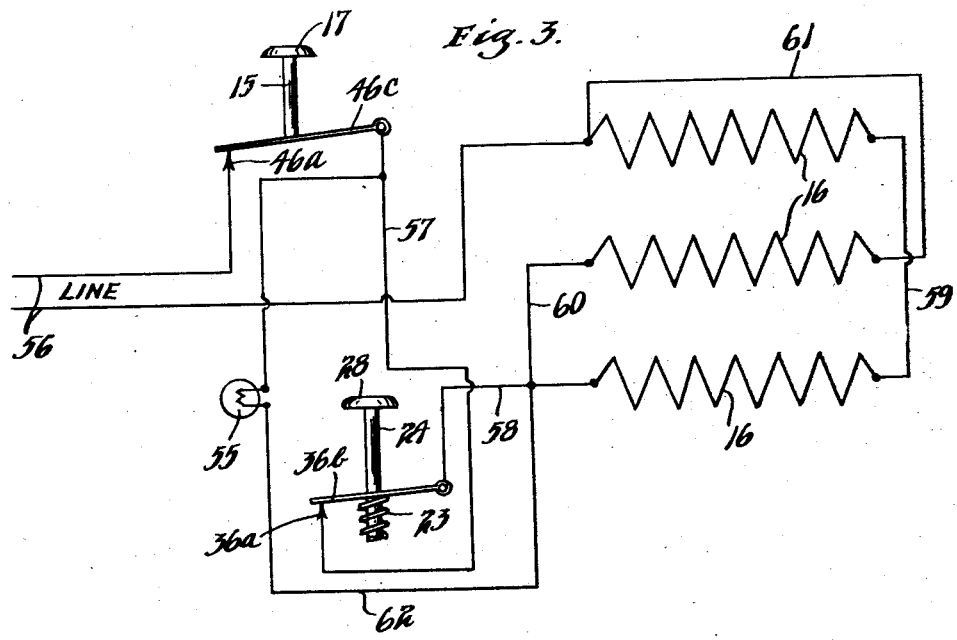
Fig. 3 is a wiring diagram of the electrical connections of the device.
Figure 4:
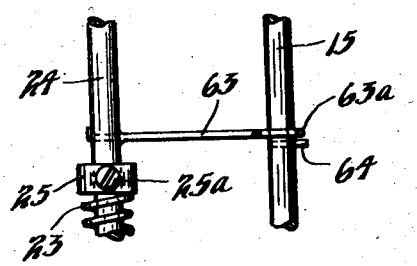
Fig. 4 is a partial view in side elevation of a portion of the operating mechanism.

In Fig. 3 a wiring diagram is shown illustrating the electrical connections for the device. A cord of the usual electric type will be provided having a plug at its end adapted to be connected to a suitable electric socket. The cord will carry the conductors 56, one of which will extend to the switch 46 and to the movable contact 46c thereof, the fixed contact 46a being indicated. A conductor 57 extends from contact 46c to the fixed contact 36a of switch 36, the movable contact 36b of which is indicated. A conductor 58 extends from movable contact 36b to one of the heating elements 16 which is shown as in series with one of the other heating elements 16, being connected thereto by a conductor 59. The central heating element 16 is in parallel with the outer elements 16, but connected to conductor 58 by a conductor 60 and being connected by conductor 61 to the other line conductor 56 which is connected to the end of one of the outer heating elements 16. Conductor 60 has connected thereto a conductor 61 extending to the movable contact 46c, lamp 55 being disposed in conductor 62.

Figure 2:
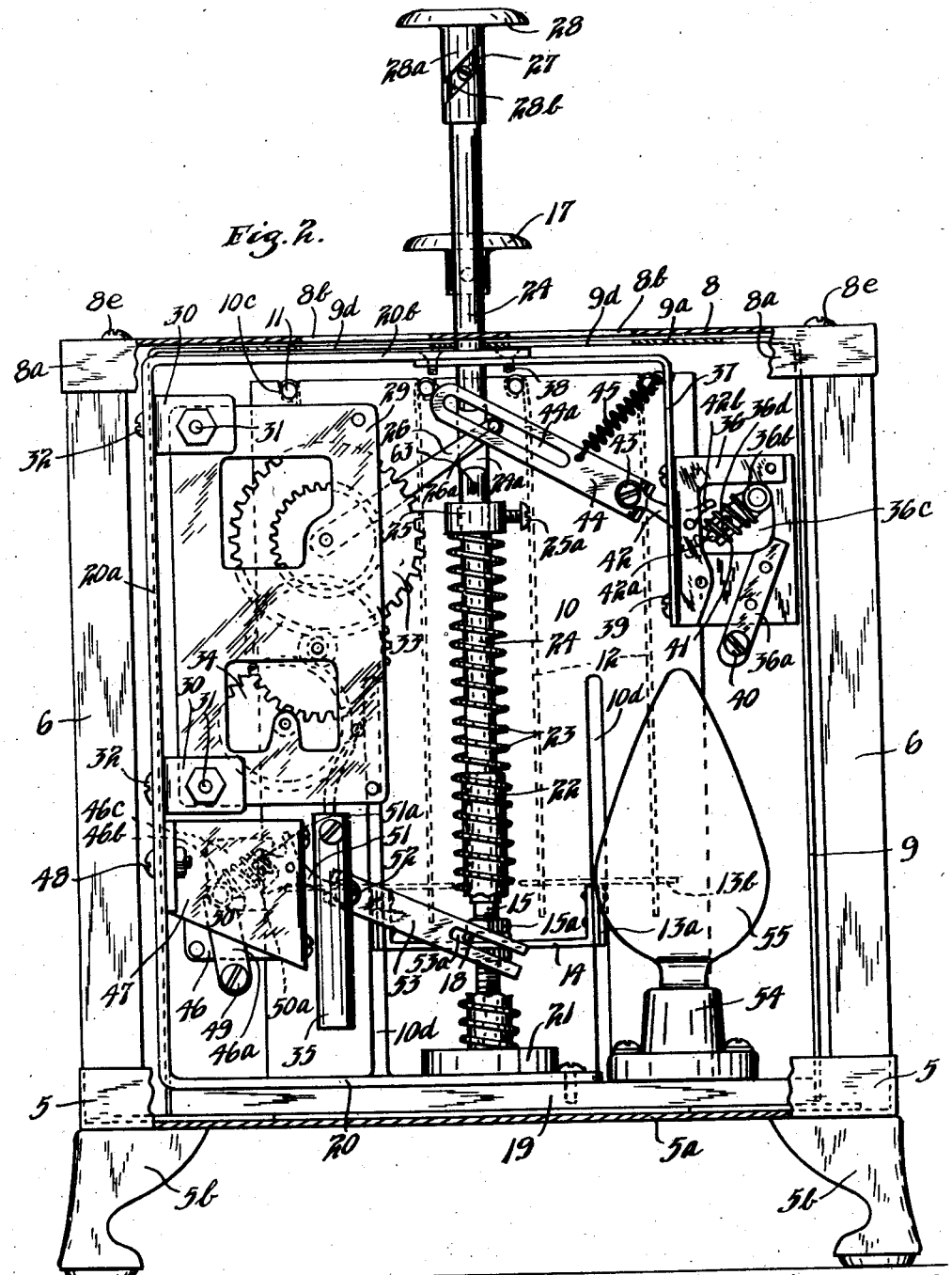
Fig. 2 is an end view of the device with one end cover removed certain parts being broken away and other parts being shown in vertical section.

In operation the toaster will normally occupy a position with both switches 36 and 46 open, spring 23 being expanded and plunger 24 being in its upper position. When the bread is to be toasted the slices of the same will be dropped through the slots 8b and will pass through the slots 9d down between wires 12 and rest on the members 13. The operator now presses down on handle 28 depressing plunger 24, which moves downward in tube 22 and compresses spring 23. This movement swings rod 26 downwardly and also swings bar 44 downwardly. When bar 44 swings downwardly the member 42 and portion 42a thereof moves into the slot 35d on member 36b compressing spring 41 and causing member 36b to move in the slot 36c so that the rounded contact portion of member 36b swings to the lower right hand corner of opening 36c and engages stationary contact 36a. The handle 17 and rod 15 when the toaster is inoperative is in elevated position, with the carriers 13 somewhat elevated. As the operator pushes down on handle 28 and depresses plunger 24, rod 15 will be pulled downward simultaneously by rod 63. This moves the carriers 13 to their lower position with the toast in proper position to be heated and as member 14 moves downwardly with rod 15, member 18 swings bar 53 downwardly swinging the movable contact 46b of switch 46 and closing said switch. Rod 24 moves downwardly until the bottom of sleeve 28a engages top plate 8b. The knob 28 and sleeve 28a can be rotated on plunger 24 and owing to helical slot 28b engaging the screw 27, this will vary the position of the handle 28 and sleeve 28a relative to rod 24. The position of sleeve 28a can thus be varied and the plunger 24 can be depressed varying amounts and will compress spring 23 varying amounts. When both switches 36 and 46 are closed heat will be supplied to the heaters 16, current passing through the upper line conductor 56 as shown in Fig. 3 to switch 46, conductor 57, switch 36 and conductors 58 and 60 to the heaters 16 and to the return line of lower line conductor 56. More heat is supplied to the central heating member 16 than to the outside heating members as the central heating member heats two sides of the toast while the outer heating members heat only one side. As soon as the operator relieves the pressure of knob 28, spring 23 begins to gradually elevate plunger 24. This movement is timed and made uniform by the clock work mechanism as the rod 24 in rising is resisted by arm 26 connected to the clock work mechanism. Plunger 24 therefore rises gradually and uniformly and as it reaches a certain position bar 44 is moved upward sufficiently, substantially to the position shown in Fig. 2 and movable contact 36b of switch 36 snaps up to the position shown in Fig. 2 which is the open position. Two parts at this time occupy the position shown in Fig. 2. The opening of switch 36 throws the fixed heating element combination of the toaster in series circuit with the lamp 55 which has a comparatively high resistance. Switch 36 now being open and the current passing through conductor 61 and the resistance 55, the current is much reduced and a much smaller amount of heat is furnished by the heaters 16. When the current passes through conductor 61, after switch 36 opens, lamp 55 is illuminated. This lamp shines through the translucent plates 7 and can readily be noticed by the operators who are in the vicinity. As stated, said lamp has been provided with a red bulb so that it forms a more noticeable signal. The operator will know that the lamp is lighted and the toast is now sufficiently toasted and as soon as convenient will then raise handle 17. This raises the carriers 13 elevating the toast through the slots 9d and 8b and through member 18, swinging bar 53 and opening the switch 46 so that the current and heat are now cut off and lamp 55 extinguished. The toast can now be removed from the device and the toaster will be ready for a new operation. It will be noted that after switch 36 is opened and the main heat is reduced to a small amount the toast will be kept warm by this small amount of heat, but will not be unduly heated or burned until the operator can approach the device and operate handle 17 to manually lift the toast and open switch 46 to cut off the heat and current. As above stated, the time that the full heat is supplied to the toast can be varied by moving handle 28 so that plunger 24 is depressed a greater or lesser distance.

From the above description it is seen that applicant has provided a very simple, efficient, compact and convenient bread toaster and one which can be quickly and easily operated. The toast may be conveniently inserted in the device and very conveniently removed therefrom. The device does not require the constant attention of the operator as after the toast is placed therein and the handles 17 and 28 depressed the device will operate and effectively toast the bread without further attention. When the toasting operation is completed the signal lamp 55 is illuminated and the operator will be informed that the toast is now ready to be removed. The toast will be kept warm until the operator can get to the device and remove the toast and shut off the current. The device can of course be built to accommodate as many slices of toast as desired. The toaster has been amply demonstrated in actual practice and found to be very successful and efficient.

It will, of course, be understood that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:—

1. A bread toaster having in combination, a casing having translucent walls, a lamp in said casing, which, when lighted, is visible through said walls, heating means in said casing, means for supporting slices of bread adjacent said heating means, means for closing an electric circuit for supplying current to said heating means, time controlled means for lighting said lamp and reducing the supply of said current after a predetermined period, and manually operated means for opening said circuit and cutting off the supply of said current.

2. A bread toaster having in combination, a casing having a top plate, heating means in said casing, a vertically movable carrier, for supporting slices of bread adjacent said heating means and for lifting said bread through said top plate, a switch adapted to be closed to supply current to said heating means, a plunger for moving said carrier and operating said switch, a handle at the top of said plunger above said top plate, means including a clock work mechanism, an operating spring therefor and a switch adapted to be opened after a predetermined length of time to reduce the amount of current and heat, a plunger for compressing said spring and closing said last mentioned switch and a handle on said plunger disposed above said top plate and means connecting said handles whereby they will be simultaneously depressed to close said switches and compress said spring.

3. A bread toaster having in combination, a casing, heating means in said casing, a vertically movable carrier for supporting slices of bread adjacent said heating means, a switch adapted to close to supply current to said heating means, a plunger for moving said carrier, said plunger being depressible to move said carrier to bring said bread adjacent said heating means and to close said switch, a second plunger means tending to elevate said second plunger after it is depressed, means controlling the elevation of said second plunger, a second switch adapted to be opened after a predetermined upward movement of said second plunger to reduce the amount of current, a signal operated when said last mentioned switch is operated to reduce the current, said first plunger being capable of being lifted to move said bread from adjacent said heating means and open said first mentioned switch to shut off the supply of current.

In testimony whereof I affix my signature.

EDGAR D. FAGEROS.